Jan. 24, 1950     R. A. PETERSON ET AL     2,495,545
MAGNETIC PARTICLE INSPECTION APPARATUS AND METHOD
Filed Sept. 6, 1946     2 Sheets-Sheet 1
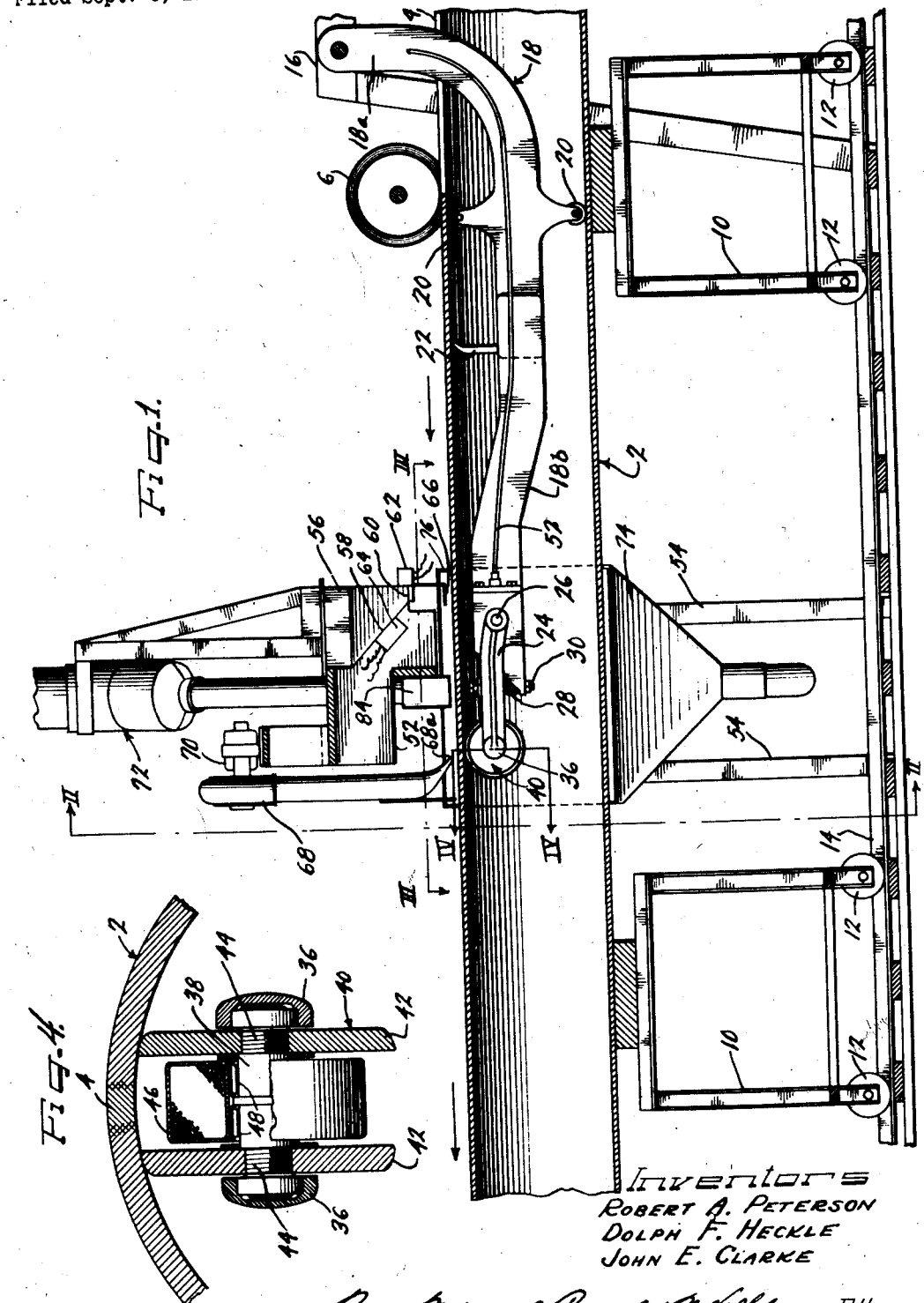

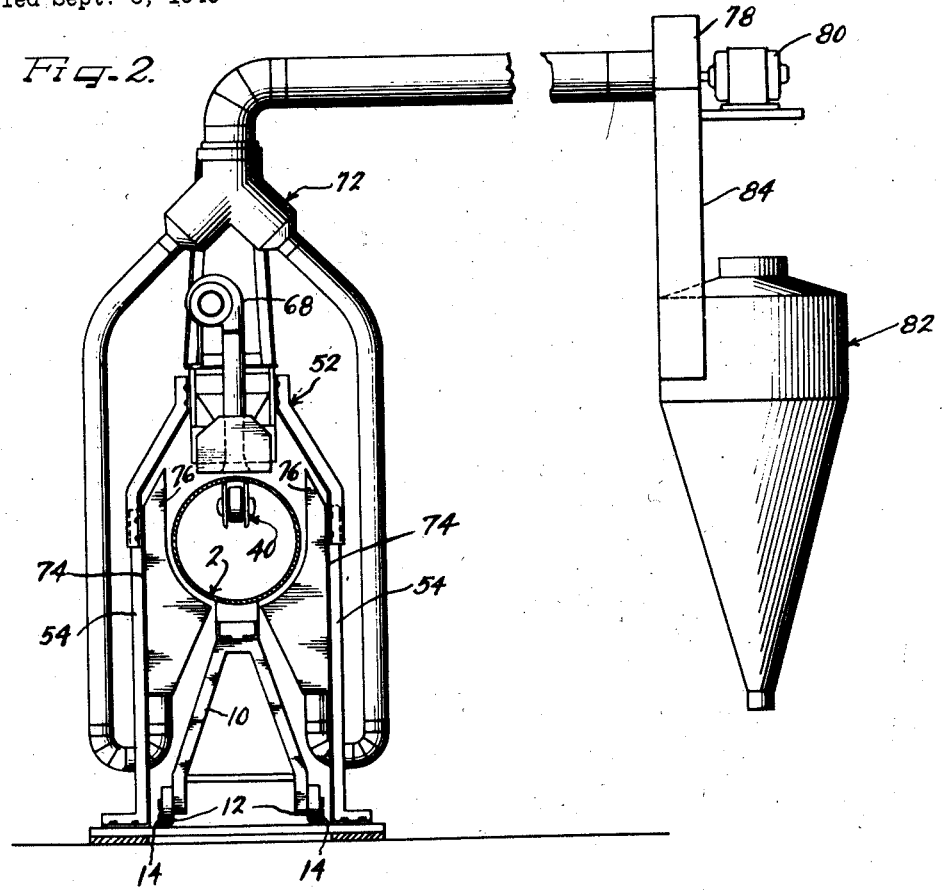
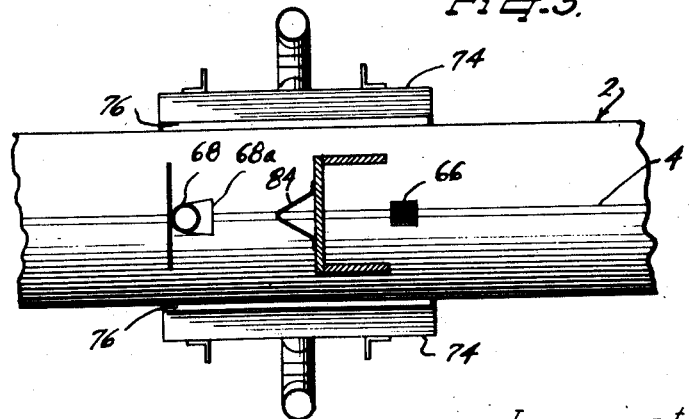

Patented Jan. 24, 1950

2,495,545

UNITED STATES PATENT OFFICE 2,495,545

MAGNETIC PARTICLE INSPECTION APPARATUS AND METHOD

Robert A. Peterson, Dolph F. Heckle, and John E. Clarke, Chicago, Ill., assignors to Magnaflux Corporation, Chicago, Ill., a corporation of Delaware Application September 6, 1946, Serial No. 695,189

8 Claims. (Cl. 113—112)

1

This invention relates to magnetic inspection methods and apparatus and particularly to methods and apparatus for magnetically inspecting a longitudinally welded joint on pipes or similar members concurrently with the production of such welds.

Large quantities of ferrous pipes are now produced by economical manufacturing processes essentially comprising the forming of the pipe material into a generally circular cross-sectional configuration and then securing the abutting edges of the pipe forming material by a longitudinal weld. In such methods of fabrication of pipe, it is obvious that the bursting strength and leakproof properties of the pipe are primarily determined by the quality of the longitudinal weld. The application of magnetic particle inspection methods to such longitudinal welds offers a convenient, inexpensive process for determining the quality of the weld; however, the magnetic particle inspection methods and apparatus heretofore known could not be conveniently applied to longitudinal pipe welds because of the obvious difficulty, due to the shape of the pipe, of establishing a magnetic field in the joint portion of the pipe and of supplying a suitable layer of magnetic particles to the magnetized joint portion to permit magnetic particle inspection of the quality of the weld to be accomplished by the customary visual inspection methods.

Accordingly, it is an object of this invention to provide improved methods and apparatus for conveniently and economically effecting the magnetic particle inspection of a longitudinal portion of an elongated ferrous testpiece.

A particular object of this invention is to provide improved methods and apparatus for effecting magnetic particle inspection of the longitudinally welded joint of a welded pipe or similar article, and particularly, to effect such inspection concurrently with the production of the longitudinal weld.

A further object of this invention is to provide an improved method and apparatus for providing a uniform deposit of magnetic particles upon a magnetized longitudinal portion of a moving testpiece and to accomplish the removal of extra magnetic particles so that continuous visual inspection of such longitudinal portions may be accomplished by the magnetic particle inspection method.

The specific nature of the invention as well as other objects and advantages thereof will become apparent to those skilled in the arts from the following detailed description and the annexed

2 sheets of drawings which, by way of preferred example only, illustrate one specific embodiment of the invention.

On the drawings:

Figure 1 is a front elevational view, partly in section, of a combined welding and magnetic inspection apparatus embodying this invention illustrating the application of such apparatus to effecting magnetic particle inspection of a longitudinally welded joint of a pipe concurrently with the welding operation;

Figure 2 is a sectional view of the apparatus in Figure 1 taken along the plane 2—2 thereof;

Figure 3 is a horizontal sectional view taken along the plane 3—3 of Figure 1; and Figure 4 is a partial, sectional view taken along the plane 4—4 of Figure 1.

As shown on the drawings:

While this invention has been illustrated as applied to effecting magnetic particle inspection of a longitudinal pipe joint weld concurrently with the welding thereof, it is to be understood that such represents merely a specific application of this invention and that the principles thereof may be readily applied to effecting magnetic particle inspection of any longitudinal testpiece, and particularly tubular testpieces.

Referring to the drawings, testpiece 2 is illustrated as comprising a pipe having abutting edges thereof defining a longitudinal joint 4 which is welded by moving the pipe longitudinally past a welding head 6, here illustrated as comprising a welding wheel. It should be understood that the welding head 6 may comprise any one of several well-known forms and the specific construction thereof forms no part of this invention.

The pipe 2 is supported for longitudinal movement in any conventional manner, such as by a plurality of carriages 10 which have wheels 12 movable along a suitable track 14. Preferably some form of driving mechanism (not shown) is provided for effecting longitudinal movement of pipe 2 at a uniform rate past the welding head 6. The pipe is moved from right to left as viewed in Figure 1.

At a point relatively ahead of welding head 6, and hence adjacent the unwelded portion of the joint 4, an upstanding frame 16 is provided which is fixed with respect to the welding head 6. Frame 16 supports a radial arm portion 18a of a support arm 18 which has a longitudinal portion 18b insertable within the interior of the pipe 2. At a point adjacent the welding head 6, the support arm 18 preferably journals a plurality of pressure rollers 20 which have a rolling engagement with the interior surface of the moving pipe 2 and assist in holding the edges forming joint 4 of such pipe in proper relationship with respect to welding head 6.

If desired, a scraper 22 may also be mounted on support arm 18 at a point behind the welding head 6 and engageable in scraping relation with the interior surface of the welded joint accomplished by the welding head 6 to remove flash, scale and other deleterious substances from the weld surface.

On the end of the inserted longitudinal arm portion 18b of support arm 18, a bearing carrying arm 24 is pivotally mounted on a pin 26. Suitable resilient means are provided for resiliently urging the bearing carrying arm 24 outwardly with respect to support arm 18. Such resilient means may conveniently comprise a helical spring 28 which is mounted in surrounding relationship upon a bolt 30 which has the shank end thereof secured in the support arm 18 and the head end of the shank passing through a suitable aperture in bearing carrying arm 24.

The free end portion of the bearing carrying arm 24 defines a pair of spaced, opposed bearings 36 which respectively journal the ends of a shaft 38 of a roller member 40.

Roller member 40 comprises a built-up member formed by the assembly of large diameter flanges 42 upon spaced threaded portions 44 on the roller shaft 38. The peripheral surfaces of flanges 42 are suitably shaped to permit such flanges to achieve a rolling engagement with the interior surface of the pipe 2 on each side of the welded joint 4.

In the central space on roller member 40 defined between flanges 42 a magnetizing coil 46 is mounted, the axis of coil 46 being substantially coaxial with that of roller member 40. Preferably the coil 46 is rotatably journalled on the central portion of roller shaft 38 by needle bearings 48. Hence, as the roller member 40 rotates due to the relative movement of the pipe 2, the magnetizing coil 46 may remain stationary. Such an arrangement greatly facilitates the supply of magnetizing current to coil 46 inasmuch as the current may be supplied through ordinary conductors without the necessity of slip rings. A cable 52 may be utilized which is mounted on support arm 18 and follows the radial portion 18a of support arm 18 to the exterior of pipe 2 at which point is is connected to a suitable source of magnetizing current (not shown).

The outwardly directed bias maintained on the bearing carrying arm 24 by the spring 28 insures that the peripheral portions of the roller member 40 will be maintained in good contacting relationship with the interior surface of the pipe 2 at areas immediately adjacent each side of the welded joint 4. Accordingly, the application of magnetizing current to magnetizing coil 46 will produce a substantial magnetic field traversing the longitudinal welded joint 4. Such magnetic field may be conveniently utilized for magnetic particle inspection of the weld joint 4.

The aforedescribed structure of the magnetizing head of the inspection apparatus is claimed in our copending application Serial No. 695,188, filed on even date herewith.

It will be noted that the magnetizing head or roller member 40 is positioned by the support arm 18 at a point a substantial distance behind the welding head 6 with respect to the direction of movement of the pipe 2. It is thus assured that the welded joint 4 will have cooled to a temperature suitable for magnetic particle inspection.

Adjacent to the magnetizing head 40, an upstanding frame unit 52 is provided comprising generally upright channel members 54 disposed in surrounding relationship to the path of the pipe 2. A hopper 56 is supported on the frame 52 and has an inclined bottom surface 58 sloping downwardly to a discharge opening 60 controlled by a solenoid operated valve 62. Hopper 56 is constructed to contain a supply of magnetic particles of the type utilized in the well-known magnetic particle inspection method. The discharge opening 60 of hopper 56 is disposed in overlying relationship to the longitudinal portion of the testpiece which is to be magnetically inspected, in this case overlying the welded joint 4. Discharge opening 60 is preferably disposed somewhat in front of the magnetizing head 40 and, of course, rearward of the welding head 6 with respect to the direction of movement of the pipe 2. To insure a uniform flow through the discharge opening 60, we preferably provide an electromagnetic vibrating unit 64 which is secured to the inclined bottom surface 58 of hoper 56. A screen 66 may be provided in underlying relationship to discharge opening 60 break up the stream of magnetic bottom surface 58 of hopper 56. A screen 66 may a uniform layer of powder to be applied to the pipe 2. Thus as layer of magnetic particles of substantially uniform thickness is deposited upon the external surface of the test surface, here the welded joint 4.

At a point immediately rearward of the position of the magnetizing head 40, a nozzle outlet 68a of a blower 68 is positioned in overlying relationship to the path of the welded joint. While the illustrated position of nozzle 68a is preferred, it obviously may be located immediately over the magnetizing head or slightly ahead of it. Blower unit 68 may be driven by a suitable motor 70 mounted on frame 52. At this location of the blower nozzle 68a, the magnetic field produced by magnetizing head 40 is of strongest intensity and accordingly the magnetic particles lying immediately upon the surface of the pipe 2 will arrange themselves on such surface in patterns which provide an indication of the existence of any defect in the magnetized portion of the pipe. The blower 68 functions to remove excess magnetic particles not held by defects in the testpiece and is purposely of such intensity as to not disturb the particles held by the defects.

A particle collecting blower unit 72 is provided having casing portions 74 disposed on each side of the path of the pipe 2 and having inlet mouths 76 suitably shaped so as to substantially surround the pipe 2. The fan 78 of the collecting unit may be driven by a suitable motor 80 and the collected magnetic particles are supplied to a collecting device 82 through a suitable conduit 84. Thus all of the excess particles blown off the pipe 2 by the action of the blower unit 68 are drawn into the inlet mouths 76 of the collecting blower unit and collected in the collecting device 82, from which they may be conveniently removed for reuse.

Preferably a vertical baffle member 84 (Figure 3) is provided intermediate the blower nozzle 68a and the hopper discharge opening 60 to prevent the air discharged by the blower nozzle from adversely influencing the flow of the magnetic particles out of the discharge opening 60 of the hopper and onto the external surface of the welded joint 4.

The operation of the method and apparatus constituting this invention will be obvious to those skilled in the arts from the foregoing description. When the magnetic particles which are retained on the external surface of the welded joint 4 by the magnetic field produced by magnetizing head 40 pass beyond the blower nozzle 60, they may be readily observed and the physical configurations thereof noted by the observer as an indication of the existence of any defect in the welded joint 4 in accordance with the conventional methods of magnetic particle inspection.

The methods and apparatus embodying this invention therefore provide convenient magnetic particle inspection of a longitudinal joint on a tubular member of great length and such inspection may be accomplished concurrently with the welding of such joint. The outstanding convenience and economy of such combined operation of the welding and inspection procedures is obvious.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. A method of continuous magnetic particle inspection of long ferrous members comprising relatively moving the member longitudinally past a magnetizing member to set up a magnetic field in the member, applying a layer of magnetic particles to the ferrous member in advance of the magnetizing member, and blowing excess particles from the ferrous member in the direction opposite to the movement of the member and at a point behind the magnetizing member with respect to the direction of movement of the ferrous member.

2. A method of continuous magnetic particle inspection of longitudinally extending regions of ferrous pipe or the like comprising supporting a magnetizing head interiorly of the pipe, moving the pipe longitudinally relative to the magnetizing head, whereby a longitudinally extending portion of the pipe is transversely magnetized, gravitationally applying a layer of magnetic particles to the external surface of the magnetized portion of the pipe in advance of the magnetizing head, and blowing excess magnetic particles from the pipe at a point adjacent the magnetizing head.

3. Magnetic inspection apparatus for long ferrous testpieces comprising a magnetizing head, means adapted for relatively moving the testpiece longitudinally past said magnetizing head, whereby a longitudinally extending area of the testpiece is magnetized, means adapted for applying a layer of magnetic particles to the longitudinally extending area of the workpiece in advance of said magnetizing head, and means for air blowing excess magnetic particles from the testpiece, said last mentioned means being disposed adjacent said magnetizing head and directing a stream of air along said test piece in the direction opposite to the movement of the test piece with respect to said head.

4. Magnetic inspection apparatus for long ferrous testpieces comprising a magnetizing head, means adapted for moving the testpiece longitudinally past said magnetizing head, whereby a longitudinally extending area of the testpiece is magnetized, a hopper adapted to contain magnetic particles and having a discharge opening disposed above the path of the longitudinal magnetized area of the workpiece and relatively ahead of said magnetizing head with respect to the direction of movement of the testpiece, and air blowing means having a discharge nozzle overlying the magnetized area of the testpiece and located relatively behind said magnetizing head with respect to the direction of movement of the testpiece, said nozzle being constructed and arranged to produce a stream of air directed along the testpiece in the direction opposite to the movement of the testpiece, whereby excess magnetic particles are blown off the longitudinally magnetized area of the testpiece so that the remaining magnetic particles afford an indication of the existence of flaws in magnetized area of the testpiece.

5. Apparatus for magnetically inspecting longitudinal portions of ferrous pipe or the like comprising a magnetizing head, means adapted for supporting said head within the pipe to be tested, means for longitudinally moving the pipe relative to said magnetizing head, whereby a longitudinally extending portion of the pipe is magnetized, means for applying a layer of magnetic particles to the external surface of the longitudinally extending area of the pipe at a point relatively in advance of said magnetizing head with respect to the direction of movement of said pipe, and means for blowing excess magnetic particles from the pipe, said last mentioned means being disposed relatively behind said magnetizing head with respect to the direction of movement of the pipe.

6. Apparatus for magnetically inspecting longitudinal portions of ferrous pipes or the like comprising a magnetizing head, means for supporting said head within the pipe to be tested, means adapted for moving the pipe longitudinally relative to said magnetizing head, whereby a longitudinally extending portion of the pipe is magnetized, a hopper adapted to contain magnetic particles and having a discharge opening disposed above the path of the magnetized portion of the pipe and located relatively ahead of said magnetizing head with respect to the direction of movement of the pipe, vibrating means on said hopper for feeding a substantially uniform amount of magnetic particles on the external surface of the magnetized portion of the pipe, air blowing means having a discharge nozzle overlying the top of the magnetized portion of the pipe and located relatively behind said magnetizing head with respect to the direction of movement of the pipe, said nozzle being constructed and arranged to produce an air stream along the surface of the pipe directed oppositely to the movement of the pipe, whereby the excess magnetic particles are blown off the external surface of the longitudinal magnetized portion of the pipe, and suction blower means having inlet openings substantially surrounding the path of the pipe at a point adjacent the discharge nozzle for collecting the excess particles.

7. A method of magnetic inspection of long hollow tubular testpieces comprising moving the testpiece longitudinally, applying a magnetic field to a localized inside surface of a longitudinal portion of the testpiece, and depositing magnetic particles on the external surface of the magnetized portion of the testpiece.

8. A method of magnetic inspection of a longitudinal welded joint on continuous length pipe or the like comprising moving the pipe longitudinally past a welding head to effect the weld thereof, supporting a magnetizing head within the interior of the pipe at a point behind the welding head by a support member passing through the unwelded joint at a point ahead of the welding head, and applying a layer of magnetic particles to the external surface of the welded pipe joint at a point adjacent the magnetizing head.

ROBERT A. PETERSON.
DOLPH F. HECKLE.
JOHN E. CLARKE.

REFERENCES CITED

The following references are of record in the file of this patent:

UNITED STATES PATENTS

| Number | Name | Date |
|---|---|---|
| 1,635,536 | Butler | July 12, 1927 |
| 2,057,091 | Eurich et al. | Oct. 13, 1936 |
| 2,065,118 | Davis | May 22, 1936 |
| 2,124,579 | Knerr | July 26, 1938 |
| 2,158,109 | DeForest | May 16, 1939 |
| 2,194,229 | Johnston et al. | Mar. 19, 1940 |
| 2,268,368 | Anderson | Dec. 30, 1941 |
| 2,308,159 | Drummond et al. | Jan. 12, 1943 |